United States Patent
Lee (10) Patent No.: US 6,834,638 B2
(45) Date of Patent: Dec. 28, 2004

(54) METHOD AND APPARATUS FOR CONTROLLING IDLE SPEED OF AN ENGINE

(75) Inventor: Jae-Hyung Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/334,928

(22) Filed: Dec. 31, 2002

(65) Prior Publication Data

US 2003/0209224 A1 Nov. 13, 2003

(30) Foreign Application Priority Data

May 9, 2002 (KR) .................................. 2002-0025577

(51) Int. Cl.[7] .............................. F02P 5/15; F02D 37/02
(52) U.S. Cl. .............................. 123/339.11; 123/406.23
(58) Field of Search ............... 123/339.11, 406.23, 123/406.24, 406.25, 406.29, 406.41, 406.5, 406.51, 406.52, 406.59, 406.64; 701/102, 110, 111

(56) References Cited

U.S. PATENT DOCUMENTS

| | | | | | |
|---|---|---|---|---|---|
| 4,862,851 A | * | 9/1989 | Washino et al. | ....... | 123/339.11 |
| 5,445,124 A | * | 8/1995 | Tomisawa et al. | ..... | 123/339.11 |
| 5,495,835 A | * | 3/1996 | Ueda | ..................... | 123/339.11 |
| 5,884,605 A | * | 3/1999 | Nagaishi et al. | ....... | 123/339.11 |
| 6,513,489 B2 | * | 2/2003 | Osanai | .................. | 123/339.11 |

* cited by examiner

Primary Examiner—Willis R. Wolfe, Jr.
(74) Attorney, Agent, or Firm—Morgan Lewis & Bockius LLP (57) ABSTRACT

The invention discloses a method and apparatus for controlling the idle speed of an engine that provides uniform control efficiency and rapid control response. An embodiment of the invention activates the ignition system based on a target ignition timing, which corresponds to a target torque ratio and is found using a predetermined relationship between ignition timing and torque ratio. The target torque ratio is calculated based on engine speed and engine load.

21 Claims, 5 Drawing Sheets

METHOD AND APPARATUS FOR CONTROLLING IDLE SPEED OF AN ENGINE

FIELD OF THE INVENTION

The present invention relates to a method and an apparatus for controlling the idle speed of an engine, and more particularly, to a method and an apparatus for controlling the idle speed of an engine by adjusting the ignition timing.

BACKGROUND OF THE INVENTION

When idling, that is, when the engine is not loaded by the driver depressing the accelerator, engine idle speed control reflects a variety of engine operation factors. Typically, the engine idle speed is controlled using the intake air drawn into the engine in the idle state, or by controlling the ignition timing. The former method is usually used to cope with a large change in engine load that may be caused by, for example, changing the selector lever position of an automatic transmission. With a small change in the engine load, such as an electrical system load change, the ignition timing is usually controlled.

According to a conventional method for controlling idle speed by controlling the ignition timing, a deviation in the current engine idle speed is calculated relative to a target idle speed. Ignition timing is controlled based on whether the deviation is positive or negative. That is, the ignition timing is retarded when the current engine idle speed is higher than the target idle speed, and the ignition timing is advanced when the current engine idle speed is lower than the target idle speed. The amount of the ignition timing is retarded or advanced is usually proportional to the deviation. Thus, the ignition timing is adjusted based on only the engine speed deviation according to the prior art, so the response to an engine load change is slow and the response speed is not uniform. Why the response speed is not uniform is shown in FIG. 1.

Figure 1:
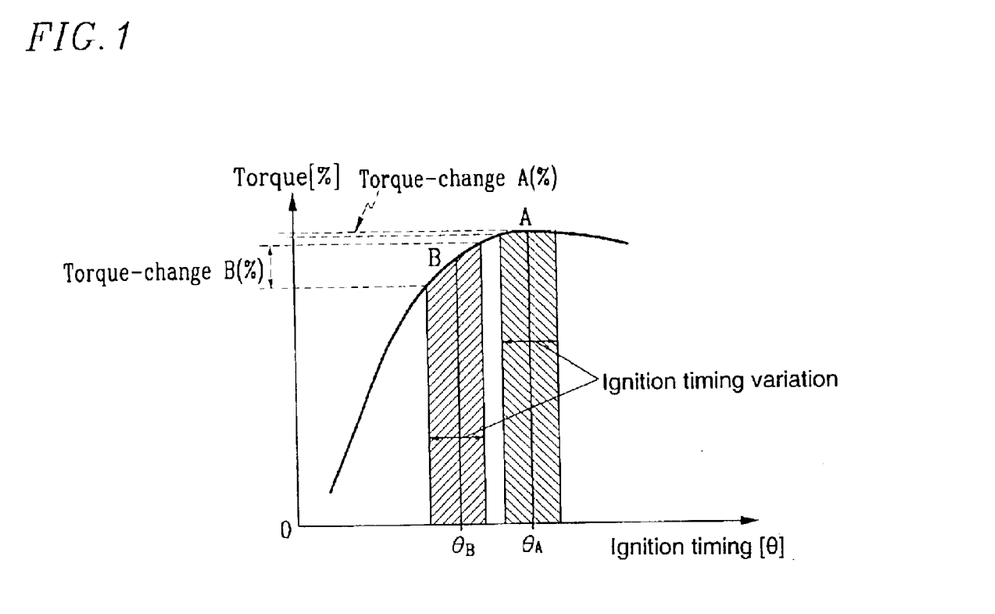
FIG. 1 illustrates the ignition timing dependency of the output torque of an engine.

FIG. 1 illustrates the ignition timing dependency of the output torque of an engine at a specific engine speed and engine load. The horizontal axis in FIG. 1 denotes ignition timing angle θ, and the vertical axis denotes torque ratio, that is, percentage of output torque with respect to the maximum torque at the engine speed and the engine load. As can be gathered from FIG. 1, at a specific engine speed and engine load, the output torque of an engine varies with respect to ignition timing. In FIG. 1, "$\theta_A$" denotes the ignition timing producing the maximum output torque, and "$\theta_B$" denotes an ignition timing slightly advanced from $\theta_A$. The bands about $\theta_B$ and $\theta_A$ show that for the same amount of ignition timing adjustment, the output torque change is dependent on the current ignition timing. That is, when the current ignition timing is at the maximum-torque ignition timing $\theta_A$, the output torque change according to the ignition timing adjustment is very small relative to the same adjustment at $\theta_B$. Consequently, the engine speed change in the first case is very small.

Therefore, when the ignition timing is adjusted based on only the engine speed deviation without considering the corresponding torque ratio change, the resulting change in engine speed is not uniform. Furthermore, when the corresponding torque ratio change is small, the engine speed slowly approaches the target idle speed because the number of control iterations is increased.

SUMMARY OF THE INVENTION

A preferred embodiment of an apparatus for controlling the idle speed of an engine according to the present invention includes: an engine speed detector for detecting an engine speed; an engine load detector for detecting an engine load; a vehicle speed detector for detecting a vehicle speed; a coolant temperature detector for detecting a coolant temperature; an air temperature detector for detecting an intake air temperature; an ignition system for igniting fuel in the engine; and a control unit for receiving signals from the detectors and for activating the ignition system based on the received signals. The control unit executes instructions for steps of a preferred embodiment of a method for controlling the idle speed of an engine according to the present invention. In a further preferred embodiment, a knock detector for detecting knocking of the engine is included.

A preferred embodiment of a method for controlling the idle speed of an engine according to the present invention includes: detecting an engine speed; detecting an engine load; calculating a target torque ratio on the basis of the engine speed and the engine load using a predetermined relationship between ignition timing and torque ratio; calculating a target ignition timing corresponding to the target torque ratio using the predetermined relationship; and activating an ignition system of the engine based on the target ignition timing. In a further preferable embodiment, the calculating a target torque ratio includes: calculating a base torque ratio based on the engine speed and the engine load; and calculating the target torque ratio from the base torque ratio.

In another preferable embodiment, the calculating a base torque ratio includes: calculating a first torque ratio based on the engine speed and engine load; calculating a first ignition timing corresponding to the first torque ratio using the predetermined relationship; adjusting the first ignition timing based on intake air temperature and coolant temperature; and calculating the base torque ratio as corresponding to a base ignition timing using the predetermined relationship.

The first torque ratio is preferably calculated as a value within a range of about 85–90%, using a predetermined map table based on the engine speed and engine load.

With use of a knock detector, the calculating a base torque ratio may preferably further include: calculating adjusted values of the first ignition timing for individual cylinders based on signals from a knock detector; and adjusting the first ignition timing to a base ignition timing, wherein the base ignition timing is an average of the adjusted values for the individual cylinders.

In a further preferable embodiment, calculating the target torque ratio from the base torque ratio calculates the target torque ratio from the base torque ratio based on an engine speed deviation and an engine speed change rate. The calculating of the target torque ratio from the base torque ratio may preferably include: calculating a proportional gain based on the engine speed deviation; calculating a differential gain based on the engine speed change rate; calculating a coefficient based on the engine speed deviation; calculating a torque difference as a result of "proportional gain×engine speed deviation+differential gain×engine speed change rate×coefficient"; calculating a maximum torque at the engine speed and engine load; and calculating the target torque ratio as a sum of the base torque ratio and a torque value calculated based on the torque difference and the maximum torque.

In a further preferred embodiment, the method further includes determining if an idle speed control condition is satisfied, and the calculating a target torque ratio calculates the target torque ratio if the idle speed control condition is satisfied.

The satisfaction of the idle speed control condition is preferably determined based on at least whether a predetermined time has elapsed from starting the engine and whether a throttle valve is closed.

In a further preferred embodiment, the ignition timing of the predetermined relationship is a relative ignition timing based on a maximum-torque ignition timing, the calculating a target ignition timing includes: calculating a relative ignition timing corresponding to the target torque ratio using the predetermined relationship; calculating the maximum torque ignition timing, and calculating the target ignition timing as the maximum-torque ignition timing increased or decreased by the relative ignition timing. The relative ignition timing is preferably a retarded relative ignition timing from the maximum-torque ignition timing.

BRIEF DESCRIPTION OF THE DRAWINGS

The accompanying drawings, which are incorporated in and constitute a part of the specification, illustrate an embodiment of the invention, and, together with the description, serve to explain the principles of the invention.

Like numerals refer to similar elements throughout the several drawings.

DETAILED DESCRIPTION OF THE PREFERRED EMBODIMENTS

Figure 2:
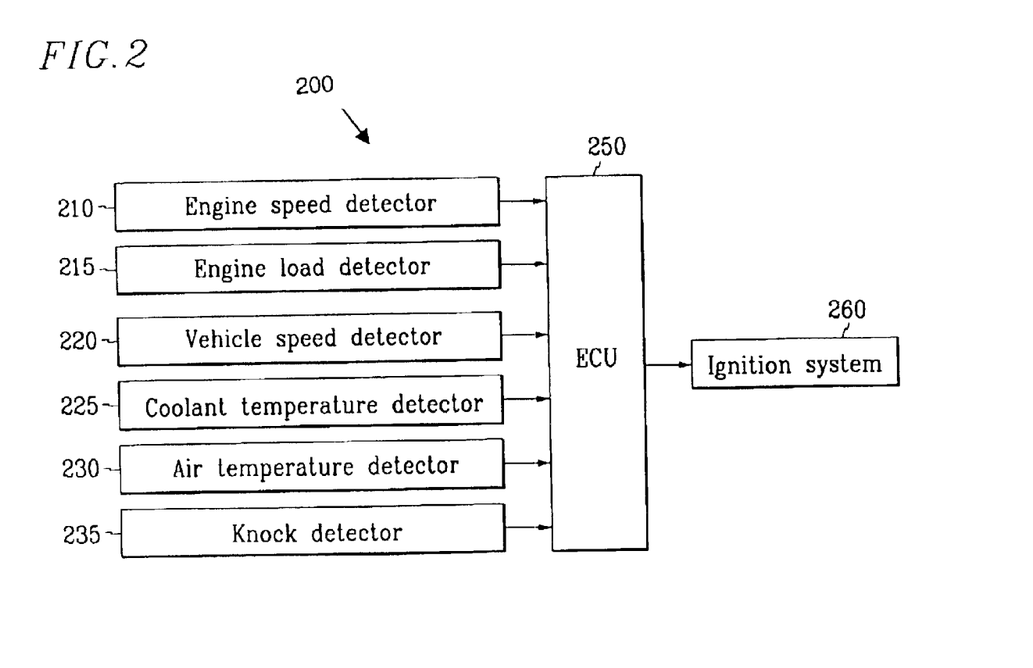
FIG. 2 is a block diagram of an apparatus for controlling the engine idle speed according to a preferred embodiment of the present invention.

FIG. 2 is a block diagram of an apparatus for controlling engine idle speed 200 according to a preferred embodiment of the present invention that adjusts the ignition timing based on the engine load in addition to the engine speed. The apparatus includes an engine speed detector 210 for detecting the engine speed. An engine load detector 215 detects an engine load. A vehicle speed detector 220 detects the vehicle speed. A coolant temperature detector 225 detects the temperature of the engine coolant. An air temperature detector 230 detects the intake air temperature. A knock detector 235 detects engine knock. An ignition system 260 delivers the spark for igniting fuel in the engine. And an electric control unit (ECU) 250 receives signals from the detectors 210–235 and activates the ignition system 260 based on the signals.

As used above, the term "engine load" denotes a number relating to how much torque the engine is asked to produce. The intake manifold pressure obtained by a Manifold Absolute Pressure sensor (MAP-sensor), or the throttle valve opening may be used to determine the engine load. Accordingly, the engine load detector 215 may be a MAP-sensor, or a throttle valve opening sensor. Of the two, a MAP-sensor is preferred because a MAP-sensor signal is more closely related to the actual engine load. Alternatively, if intake air is detected by an air-flow sensor, the engine load detector 215 may be the air-flow sensor. The types of detectors used in the detectors 210, 220, 225, 230, and 235 would be apparent to a person or ordinary skill in the art.

The ignition system 260 includes an ignition plug and an apparatus for firing the ignition plug at the required ignition timing. The ECU 250 is one or more processors programmed with software to perform each step of a method for controlling engine idle speed according to a preferred embodiment of this invention.

Figure 3:
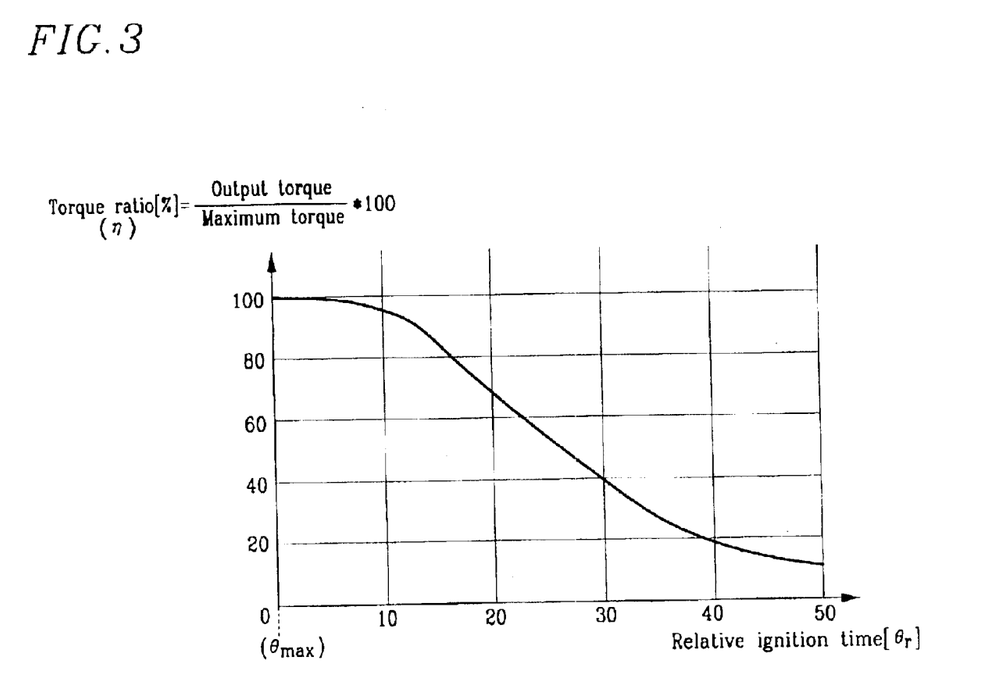
FIG. 3 is a graph of an exemplary relationship between ignition timing ($\theta$) and torque ratio ($\eta$)

The relationship between ignition timing and output engine torque is illustrated in FIG. 3. The horizontal axis of FIG. 3 denotes the deviation of the ignition timing (i.e., the relative ignition timing) $\theta_r$, from a maximum-torque ignition timing $\theta_{max}$. The origin is the maximum-torque ignition timing $\theta_{max}$. The maximum-torque ignition timing $\theta_{max}$ denotes the ignition timing $\theta$ where maximum-torque is output at a specific engine speed $\omega$ and engine load L. Therefore, $\theta_{max}$ is dependent on $\omega$ and L. The vertical axis of FIG. 3 is the percentage of output torque available given a relative ignition timing $\theta_r$, relative to the maximum-torque $T_{max}$ at $\theta_{max}$.

The relative ignition timing $\theta_r$ may be either an advance angle or a retard angle from the maximum-torque ignition timing $\theta_{max}$. Preferably it is a retard angle because, practically speaking, the amount of advance angle (and accordingly the amount that torque that can be manipulated) is limited by knocking. The maximum torque $T_{max}$ output and the maximum-torque ignition timing $\theta_{max}$ vary according to engine operating conditions, for example, engine speed $\omega$ and engine load L. But the relationship between the torque ratio $\eta$ ((output torque/maximum torque)$\times 100$) and the relative ignition timing $\theta_r$, from the maximum-torque ignition timing $\theta_{max}[(\theta_n/\theta_{max})\times 100]$ is almost independent of the engine speed $\omega$ and the engine load L, as shown in its characteristic curve in FIG. 3. The characteristic curve of FIG. 3 for a specific engine can be obtained by simple engine experiments, which are known to a person of ordinary skill in the art.

From the relationship shown in FIG. 3, a torque ratio $\eta$ is found to correspond to the relative ignition timing $\theta_r$. Inversely, a relative ignition timing $\theta_r$ is found to correspond to a torque ratio $\eta$. The correspondences are experimentally determined and stored in the ECU 250 in the form of map tables. The map tables are respectively referred to as a base map "$MAP_0$" and an inverse base map "$MAP_0^{-1}$". That is, the base map and inverse base map are respectively calculated as "$\eta=MAP_0(\theta_r)$" and "$\theta_r=MAP_0^{-1}(\eta)$".

Figure 4:
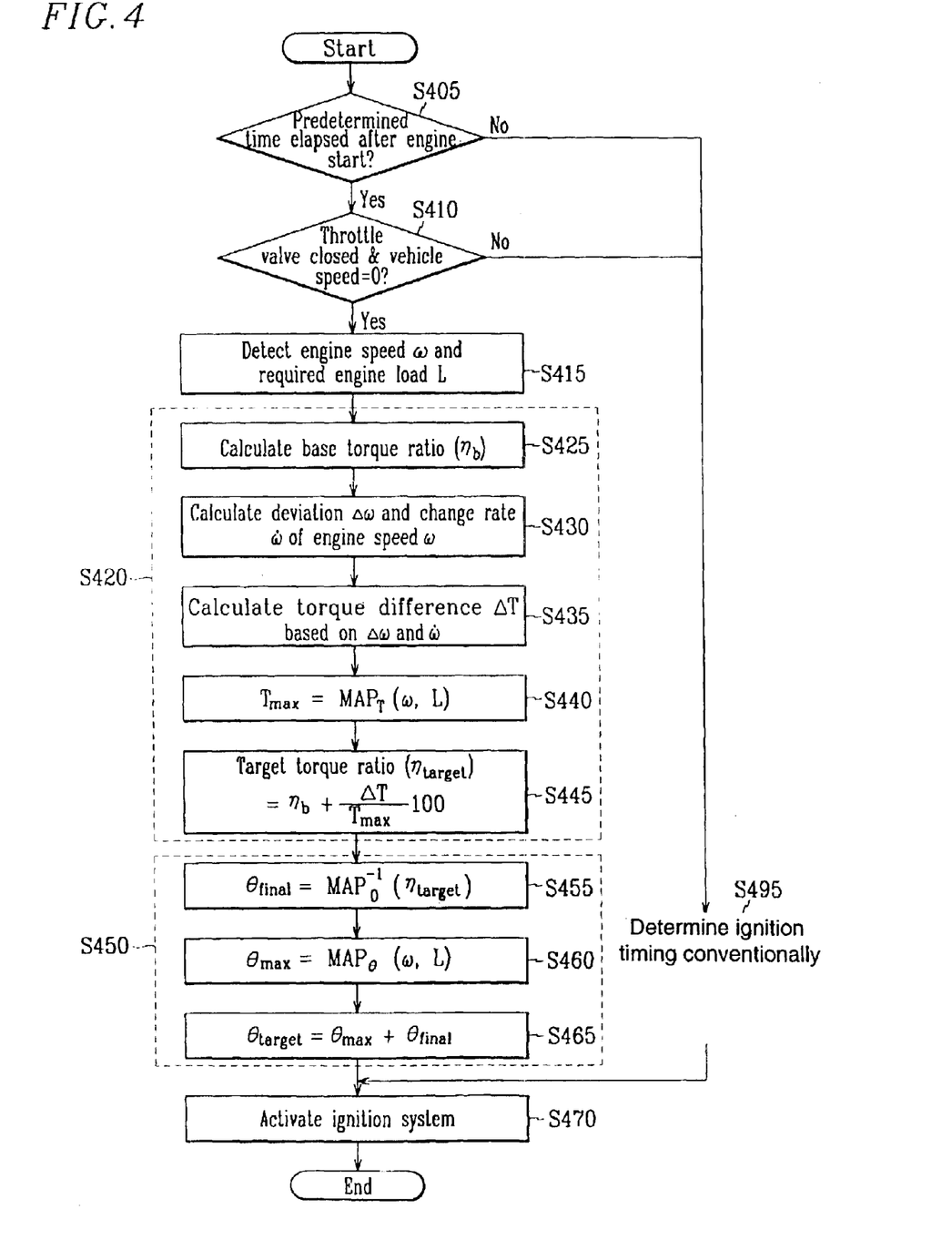
FIG. 4 is a flowchart of a method for controlling engine idle speed according to a preferred embodiment of the present invention.

As shown in FIG. 4, the ECU 250 determines whether an idle speed control condition is satisfied in steps S405 and S410. The ECU 250 determines whether the predetermined time has elapsed since starting of the engine in step S405. If so, in step 410, the ECU determines whether the throttle valve is closed and the vehicle speed is "0". The specific value of the predetermined time may be determined by a person of ordinary skill in the art considering that fuel delivery and ignition timing are typically tightly controlled during the starting of the engine. Therefore, the predetermined time is chosen so that a preferable embodiment does not affect the starting fuel and ignition timing control.

If the idle control conditions of steps S405 and S410 are not satisfied, in step S495 the ECU 250 determines the ignition timing according to conventional methods and activates the ignition system 260 based on the ignition timing in step S470. If the idle speed conditions are satisfied, in step S415 the ECU 250 detects an engine speed ω and an engine load L using the engine speed detector 210 and engine load detector 215.

In step S420, which includes steps S425 through S445, the ECU 250 calculates a target torque ratio $\eta_{target}$ based on the detected engine speed ω and engine load L. The step S420 begins in step S425, where the ECU 250 calculates a base torque ratio $\eta_b$ (see also FIG. 7). Step S425 is described in greater detail with reference to FIG. 5, below. Continuing with FIG. 4, in step S430, the ECU 250 calculates an engine speed deviation Δω and an engine speed change rate ω̇. The engine speed deviation Δω is a deviation of a current engine idle speed ω from a predetermined target idle speed $\omega_{target}$, and the engine speed change rate ω̇ is a change rate of the engine speed ω with respect to time. In step S435 the ECU 250 calculates a torque difference ΔT based on Δω and ω̇. In step S440, the ECU 250 retrieves the value of $T_{max}$ from $MAP_T$ based on ω and L. Finally, in step S445, the ECU 250 calculates the target torque ratio $\eta_{target}$ (see also FIG. 7) based on the calculated torque difference ΔT adjusted by the base torque ratio $\eta_b$ according to the equation $$\eta_{target} = \eta_b + \frac{\Delta T}{T_{max}} \times 100.$$

The maximum torque $T_{max}$ is preferably calculated from a predetermined map table "$MAP_T$", values of which can be obtained from simple engine experiments by a person of ordinary skill in the art. As further illustrated in FIG. 7, target torque ratio $\eta_{target}$ may be calculated by the equation $$"\eta_{target} = \eta_b + \frac{\Delta T}{T_{max}} \times 100".$$

Figure 7:
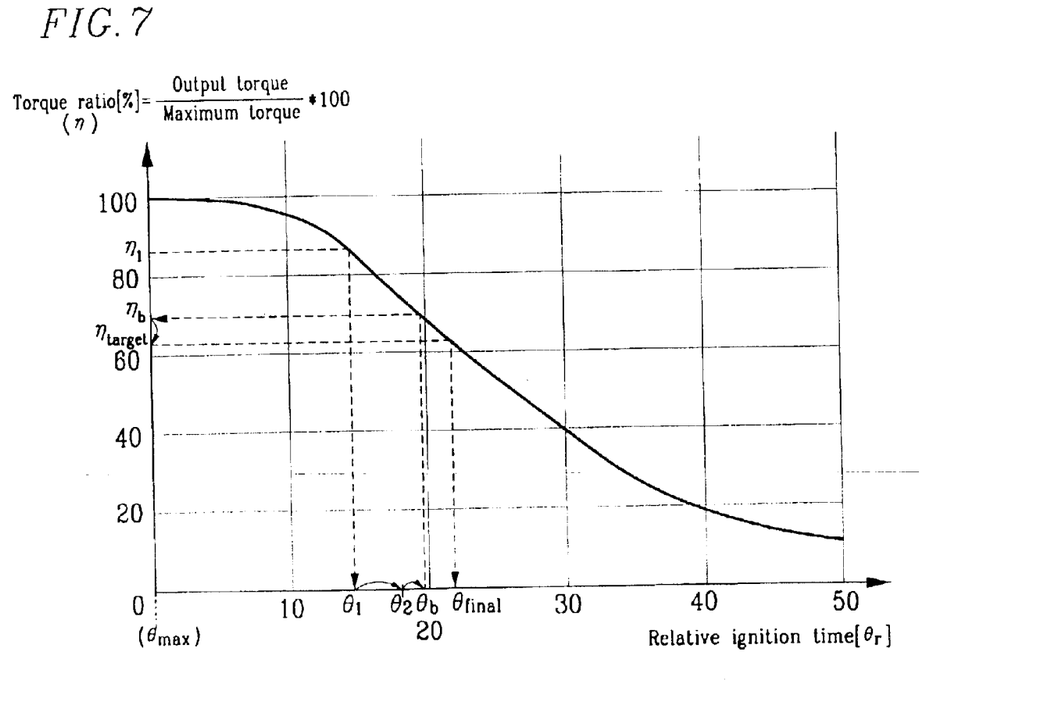
FIG. 7 shows an exemplary calculation process for a target ignition timing according to a preferred embodiment of the present invention, on the exemplary graph of FIG. 3.

The number "100" represents percentage which is used as the vertical axis scale FIG. 7 and may be changed to another number for a different scale.

Figure 5:
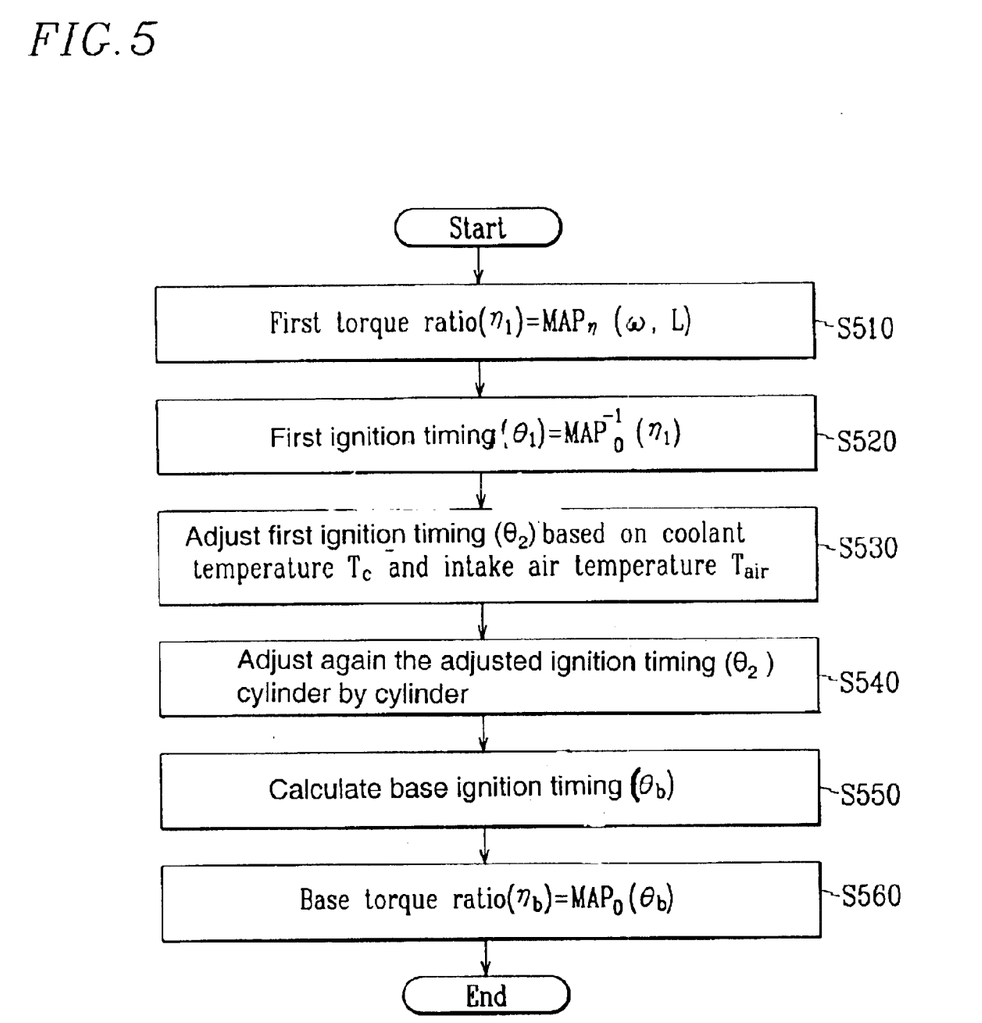
FIG. 5 is a detailed flowchart for calculating a base torque ratio in a method for controlling engine idle speed according to a preferred embodiment of the present invention.

The step S425, of calculating the base torque ratio $\eta_b$, is now described in greater detail with reference to FIG. 5. To calculate the base torque ratio $\eta_b$, in step S510 the ECU 250 calculates a first torque ratio $\eta_1$ (see also FIG. 7) as a predetermined value. The first torque ratio $\eta_1$ is preferably retrieved from a pre-calculated map table "$MAP_\eta$" based on the engine speed ω and engine load L.

The torque ratios in $MAP_\eta$ are chosen for each engine idle speed ω and engine load L for better control efficiency and less fuel consumption. Values of the first torque ratio $\eta_1$ will be apparent to one of ordinary skill in the art considering the specifications of the engine. Values in the range of about 80% to 100% may be used. But it has been found that values in the range of about 85–90% are preferable because the range is sufficiently close to 100% and at the same time these values show a sufficiently steep slope in the relationship between the relative ignition timing and torque ratio.

In step S520, the ECU 250 calculates a first ignition timing $\theta_1$ corresponding to the first torque ratio $\eta_1$. The first ignition timing $\theta_1$ is calculated as a value of "$\theta_1 = MAP_0^{-1}(\eta_1)$" from the inverse base map "$MAP_0^{-1}$" (see also FIG. 7 for a graphical depiction for determining $\theta_1$). In step S530, the ECU 250 calculates a second ignition timing $\theta_2$ by adjusting the first ignition timing $\theta_1$ based on a coolant temperature $T_c$ and an intake air temperature $T_{air}$ (see also FIG. 7).

The first ignition timing $\theta_1$ is adjusted to obtain the second ignition timing $\theta_2$ because the data as represented in FIG. 7 is obtained at a specific intake air temperature and coolant temperature and therefore compensation for a current intake air temperature $T_{air}$ and coolant temperature $T_c$ is needed. The amount of adjustment will be apparent to one of ordinary skill in the art.

In step S540, the ECU 250 adjusts the second ignition timing $\theta_2$ for each cylinder of the engine based on signals from the knock detector 235. Subsequently in step S550, the ECU 250 calculates a base ignition timing $\theta_b$ (see also FIG. 7) as a moving average of all the adjusted second ignition timings $\theta_2$. The step S540 of adjusting the second ignition timing $\theta_2$ reflects that when a knock is detected with respect to a specific cylinder, ignition timing at the specific cylinder is usually retarded. Accordingly, adjustment of the second ignition timing $\theta_2$ based on the knock detection may be cylinder dependent. Therefore, by calculating the base ignition timing $\theta_b$ as an averaged value of all the second ignition timings $\theta_2$ adjusted cylinder by cylinder, the ignition timing according to a preferred embodiment of the present invention becomes more stable.

In step S560, the ECU 250 calculates a base torque ratio $\eta_b$ as a torque ratio corresponding to the base ignition timing $\theta_b$ using the equation: "$\eta_b = MAP_0(\theta_b)$" (see also FIG. 7).

Referring back to FIG. 4, in step S430 the ECU 250 continues and calculates the engine speed deviation Δω and the engine speed change rate ω̇, and calculates torque difference ΔT based on the engine speed deviation Δω and the engine speed change rate ω̇ in step S435, as discussed previously.

Figure 6:
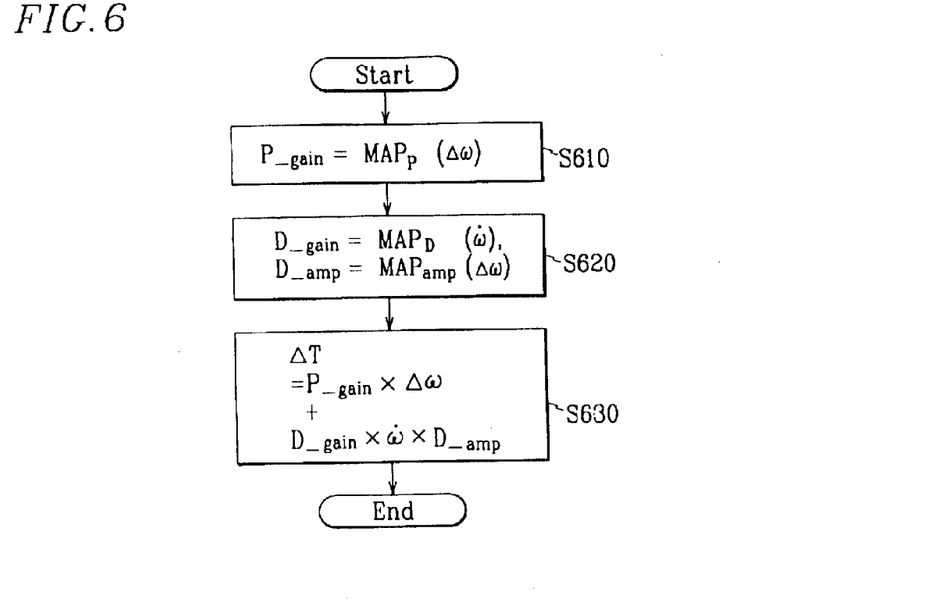
FIG. 6 is a detailed flowchart for calculating a torque difference in a method for controlling engine idle speed according to a preferred embodiment of the present invention.

FIG. 6 is a detailed flowchart of step S435 for calculating the torque difference. At step S610, the ECU 250 calculates a proportional gain (P_gain) based on the engine speed deviation Δω from a predetermined map table "$MAP_P$". In step S620, the ECU 250 calculates a differential gain (D_gain) using the engine speed change rate ω̇ and a predetermined map table "$MAP_D$." The ECU 250 also calculates a proportional coefficient (D_amp) using the engine speed deviation Δω and a predetermined map table "$MAP_{amp}$". The proportional coefficient D_amp is later used for adjustment of the differential gain D_gain.

The testing needed to find the values for the map tables "$MAP_P$", "$MAP_D$", and "$MAP_{amp}$" will be apparent to a person of ordinary skill in the art. These values should be such that the engine speed ω converges to the target idle speed $\omega_{target}$ by a proportional/differential control based on the engine speed deviation Δω and engine speed change rate ω̇. In step S630, the ECU calculates the torque difference ΔT based on the gains P_gain and D_gain and the proportional coefficient D_amp. For example, the torque difference ΔT is calculated by the equation "$\Delta T = (P\_gain \times \Delta\omega) + (D\_gain \times \omega \times D\_amp)$".

Referring back to FIG. 4, in step S440 the ECU 250 continues and calculates the maximum torque $T_{max}$ at the current engine idle speed ω and engine load L. In step S450, the ECU 250 calculates a target ignition timing $\theta_{target}$ corresponding to the target torque ratio $\eta_{target}$. In step S455, to calculate the target ignition timing $\theta_{target}$, the ECU 250 calculates a final ignition timing $\theta_{final}$ that corresponds to the target torque ratio $\eta_{target}$ from the inverse base map "$MAP_0^{-1}$". Subsequently, in step S460, the ECU 250 retrieves the maximum-torque ignition timing $\theta_{max}$ that corresponds to ω and L from a predetermined map table "$MAP_\theta$". Then, in step S465, the ECU 250 calculates the target ignition timing $\theta_{target}$ by adding the final ignition timing $\theta_{final}$ to the maximum-torque ignition timing $\theta_{max}$. The final ignition timing $\theta_{final}$ is added to the maximum-torque ignition timing $\theta_{max}$ because the relative ignition timing $\theta_r$ is supposed to be a retarded angle. In the opposite case that the relative ignition timing $\theta_r$ is an advanced angle, the final ignition timing $\theta_{final}$ is subtracted from the maximum-torque ignition timing $\theta_{max}$. In step S470, the ECU 250 activates the ignition system 260 based on the target ignition timing $\theta_{target}$.

According to a preferred embodiment of the present invention, engine idle control is more efficient, more stable, and more rapid because the target ignition timing is calculated using a relationship between ignition timing and torque ratio. The engine idle speed is controlled more stably under a variety of engine operating conditions because the appropriate torque ratio is found using the engine speed and engine load to calculate the target ignition timing. Additionally, the engine idle speed accounts for factors, such as intake air temperature and coolant temperature, in calculating the target ignition timing. In addition, abrupt fluctuation of the target ignition timing is prevented because knock adjustment based on specific cylinders is averaged out. Also, a preferred embodiment of the present invention can be applied to a variety of engines because the relative ignition timing from a maximum-torque ignition timing is used, eliminating dependency on a specific engine characteristic curve. Furthermore, the range of the ignition timing can be widened by setting the ignition timing to a retarded angle in relation to the maximum-torque ignition timing.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling an idle speed of an engine, comprising:

detecting an engine speed;

detecting an engine load;

calculating a target torque ratio on the basis of the engine speed and the engine load using a predetermined relationship between ignition timing and torque ratio, wherein the calculating a torque ratio comprises:

calculating a base torque ratio based on the engine speed and the engine load, wherein the calculating a base torque ratio comprises:

calculating a first torque ratio based on the engine speed and engine load;

calculating a first ignition timing corresponding to the first torque ratio using the predetermined relationship;

adjusting the first ignition timing based on intake air temperature and coolant temperature; and calculating the base torque ratio as corresponding to a base ignition timing using the predetermined relationship; and calculating the target torque ratio from the base torque ratio;

calculating a target ignition timing corresponding to the target torque ratio using the predetermined relationship; and activating an ignition system of the engine based on the target ignition timing.

2. The method of claim 1, wherein the first torque ratio is calculated as a value within a range of about 85–90%.

3. The method of claim 1, wherein the first torque ratio is calculated from a predetermined map table based on the engine speed and engine load.

4. The method of claim 1, wherein the calculating a base torque ratio further comprises:

calculating adjusted values of the first ignition timing for individual cylinders based on signals from a knock detector; and adjusting the first ignition timing to a base ignition timing, wherein the base ignition timing is an average of the adjusted values for the individual cylinders.

5. A method for controlling an idle speed of an engine, comprising:

detecting an engine speed;

detecting an engine load;

calculating a target torque ratio on the basis of the engine speed and the engine load using a predetermined relationship between ignition timing and torque ratio, wherein the calculating a torque ratio comprises:

calculating a base torque ratio based on the engine speed and the engine load; and calculating the target torque ratio from the base torque ratio, wherein the calculating the target torque ratio from the base torque ratio calculates the target torque ratio from the base torque ratio based on an engine speed deviation and an engine speed change rate;

calculating a target ignition timing corresponding to the target torque ratio using the predetermined relationship; and activating an ignition system of the engine based on the target ignition timing.

6. A method for controlling an idle speed of an engine, comprising:

detecting an engine speed;

detecting an engine load;

calculating a target torque ratio on the basis of the engine speed and the engine load using a predetermined relationship between ignition timing and torque ratio, wherein the calculating a torque ratio comprises:

calculating a base torque ratio based on the engine speed and the engine load; and calculating the target torque ratio from the base torque ratio, wherein the calculating the target torque ratio from the base torque comprises:

calculating a proportional gain based on the engine speed deviation;

calculating a differential gain based on the engine speed change rate;

calculating a coefficient based on the engine speed deviation;

calculating a torque difference as a result of "proportional gain×engine speed deviation+differential gain×engine speed change rate×coefficient";

calculating a maximum torque at the engine speed and engine load; and calculating the target torque ratio as a sum of the base torque ratio and a torque value calculated based on the torque difference and the maximum torque;

calculating a target ignition timing corresponding to the taraet torque ratio using the predetermined relationship; and activating an ignition system of the engine based on the target ignition timing.

7. A method for controlling an idle speed of an engine, wherein the idle speed control condition comprises a predetermined time having elapsed from starting the engine and a throttle valve being closed, comprising:
  detecting an engine speed;
  detecting an engine load;
  calculating a target torque ratio on the basis of the engine speed and the engine load using a predetermined relationship between ignition timing and torque ratio;
  calculating a target ignition timing corresponding to the target torque ratio using the predetermined relationship; and
  activating an ignition system of the engine based on the target ignition timing.

8. A method for controlling an idle speed of an engine; comprising:
  detecting an engine speed;
  detecting an engine load;
  calculating a target torque ratio on the basis of the engine speed and the engine load using a predetermined relationship between ignition timing and torque ratio, wherein the ignition timing of the predetermined relationship is a relative ignition timing based on a maximum-torque ignition timing;
  calculating a target ignition timing corresponding to the target torque ratio using the predetermined relationship, wherein the calculating a target ignition timing comprises:
    calculating a relative ignition timing corresponding to the target torque ratio using the predetermined relationship;
    calculating the maximum torque ignition timing; and
    calculating the target ignition timing as the maximum-torque ignition timing increased or decreased according to the relative ignition timing; and
  activating an ignition system of the engine based on the target ignition timing.

9. The method of claim 8, wherein the relative ignition timing is a retarded relative ignition timing from the maximum-torque ignition timing.

10. An apparatus for controlling an idle speed of an engine, comprising:
  an engine speed detector for detecting an engine speed;
  an engine load detector for detecting an engine load;
  a vehicle speed detector for detecting a vehicle speed;
  a coolant temperature detector for detecting a coolant temperature;
  an air temperature detector for detecting an intake air temperature;
  a knock detector for detecting engine knocking;
  an ignition system for igniting fuel in the engine;
  a control unit for receiving signals from the detectors and for activating the ignition system based on the received signals, wherein the control unit executes instructions for:
    detecting an engine speed;
    detecting an engine load;
    calculating a first torque ratio based on the engine speed and the engine load;
    calculating a first ignition timing corresponding to the first torque ratio using the predetermined relationship;
    adjusting the first ignition timing based on intake air temperature and coolant temperature;
    calculating adjusted values of the first ignition timing for individual cylinders based on signals from a knock detector;
    adjusting the first ignition timing to a base ignition timing, wherein the base ignition timing is an average of the adjusted values for the individual cylinders;
    calculating the base torque ratio as corresponding to the base ignition timing using the predetermined relationship;
    calculating the target torque ratio from the base torque ratio;
    calculating a target ignition timing corresponding to the target torque ratio using the predetermined relationship; and
    activating an ignition system of the engine based on the ignition timing.

11. The apparatus of claim 10 wherein the relative ignition timing is a retarded relative ignition timing from the maximum-torque ignition timing.

12. An apparatus for controlling an idle speed of an engine, comprising:
  an engine speed detector for detecting an engine speed;
  an engine load detector for detecting an engine load;
  a vehicle speed detector for detecting a vehicle speed;
  a coolant temperature detector for detecting a coolant temperature;
  an air temperature detector for detecting an intake air temperature;
  an ignition system for igniting fuel in the engine;
  a control unit for receiving signals from the detectors and for activating the ignition system based on the received signals, wherein the control unit executes instructions for:
    detecting an engine speed;
    detecting an engine load;
    calculating a target torque ratio on the basis of the engine speed and the engine load using a predetermined relationship between ignition timing and torque ratio;
    calculating a target ignition timing corresponding to the target torque ratio using the predetermined relationship; and
    activating an ignition system of the engine based on the target ignition timing.

13. The apparatus of claim 12, wherein the calculating a target torque ratio comprises:
  calculating a base torque ratio based on the engine speed and the engine load; and
  calculating the target torque ratio from the base torque ratio.

14. The apparatus of claim 13, wherein the calculating a base torque ratio comprises:
  calculating a first torque ratio based on the engine speed and engine load;
  calculating a first ignition timing corresponding to the first torque ratio using the predetermined relationship; and
  adjusting the first ignition timing based on intake air temperature and coolant temperature; and
  calculating the base torque ratio as corresponding to a base ignition timing using the predetermined relationship.

15. The apparatus of claim 14, wherein the first torque ratio is calculated as a value within a range of about 85–90%.

16. The apparatus of claim 14, wherein the first torque ratio is calculated from a predetermined map table based on the engine speed and engine load.

17. The apparatus of claim 13, wherein the calculating the target torque ratio from the base torque ratio calculates the target torque ratio from the base torque ratio based on an engine speed deviation and an engine speed change rate.

18. The apparatus of claim 13, wherein the calculating the target torque ratio from the base torque ratio comprises:
- calculating a proportional gain based on the engine speed deviation;
- calculating a differential gain based on the engine speed change rate;
- calculating a coefficient based on the engine speed deviation; calculating a torque difference as a result of "proportional gain×engine speed deviation+differential gain×engine speed change rate×coefficient";
- calculating a maximum torque at the engine speed and engine load; and
- calculating the target torque ratio as a sum of the base torque ratio and a torque value calculated based on the torque difference and the maximum torque.

19. The apparatus of claim 12, wherein:
the control unit executes further instructions for determining if an idle speed control condition is satisfied; and wherein the calculating a target torque ratio calculates the target torque ratio if the idle speed control condition is satisfied.

20. The apparatus of claim 19, wherein the idle speed control condition comprises: a predetermined time having elapsed from starting the engine; and a throttle valve being closed.

21. The apparatus of claim 12, wherein:
the ignition timing of the predetermined relationship is a relative ignition timing based on a maximum-torque ignition timing;
the calculating a target ignition timing comprises:
- calculating a relative ignition timing corresponding to the target torque ratio using the predetermined relationship;
- calculating the maximum torque ignition timing; and
- calculating the target ignition timing as the maximum-torque ignition timing increased or decreased by the relative ignition timing.

* * * * *